April 5, 1966   C. E. STEVENS ET AL   3,244,960
ELECTRICAL CIRCUITRY EMPLOYING AN ISOLATION TRANSFORMER
Filed May 1, 1961   4 Sheets-Sheet 1

INVENTORS
CURTIS E. STEVENS
THEODOR F. STURM
BY Reed C. Lawlor
ATTORNEY

INVENTORS
CURTIS E. STEVENS
THEODOR F. STURM
BY
ATTORNEY

April 5, 1966   C. E. STEVENS ET AL   3,244,960
ELECTRICAL CIRCUITRY EMPLOYING AN ISOLATION TRANSFORMER
Filed May 1, 1961   4 Sheets-Sheet 3

INVENTORS
CURTIS E. STEVENS
THEODOR F. STURM
BY
*Reed C. Lawlor*
ATTORNEY

April 5, 1966  C. E. STEVENS ET AL  3,244,960
ELECTRICAL CIRCUITRY EMPLOYING AN ISOLATION TRANSFORMER
Filed May 1, 1961  4 Sheets-Sheet 4

INVENTORS
CURTIS E. STEVENS
THEODOR F. STURM
BY
ATTORNEY

United States Patent Office 3,244,960
Patented Apr. 5, 1966

3,244,960
ELECTRICAL CIRCUITRY EMPLOYING AN
ISOLATION TRANSFORMER
Curtis E. Stevens and Theodor F. Sturm, Altadena, Calif.,
assignors to United Electrodynamics, Inc., Pasadena,
Calif., a corporation of California
Filed May 1, 1961, Ser. No. 106,933
12 Claims. (Cl. 321—8)

This invention relates to improvements in electrical circuitry in which an isolation transformer is employed to isolate elements in a primary winding circuit from elements in a secondary winding circuit. More particularly, the invention relates to an improved isolation transformer of the balanced type and more particularly to a power supply system in which a rectifier and a load attached thereto are isolated from the elements in the primary winding circuit.

While the invention may be applied to other systems, it is specifically described herein with reference to a power supply system in which A.C. (alternating current) voltage applied to a primary winding of an isolation transformer is transferred to a secondary winding circuit that includes a rectifier. As conventionally employed, the primary winding and the secondary winding of such a system is center tapped and the connections are such that no alternating current voltage would apppear between the center tap of the secondary winding and the center tap of the primary winding if all of the leakage capacitance between the windings themselves and between the windings and the core elements on which they are wound were in perfect balance. Heretofore any residual unbalance that causes an alternating current voltage to develop between the center taps of the two windings have been reduced by the introduction of trimming capacitors or other balancing impedances. This system, however, has not proved satisfactory, especially where it has been necessary to use the circuitry over a wide temperature range, since temperature variations in the characteristics of the trimming capacitors or other balancing elements are such that though the circuit may be balanced at one temperature it becomes unbalanced at another temperature.

In accordance with this invention an improved shielding arrangement is embodied in the isolation transformer for greatly reducing the leakage capacitance between each of the transformer windings and the other and also between each of the transformer windings and the core on which the windings are wound. Additional shielding is embodied in the isolation transformer for greatly reducing the leakage capacitance between each of the transformer windings and the core on which the windings are wound. Additional shielding is employed to reduce the leakage inductance so that the transformer not only makes it possible to attenuate the transmission of alternating current signals from the primary winding to the floating leads of a D.C. power supply but also provides for improved regulation of the voltage at the output of a rectifier in the secondary windings circuit. The shielding arrangement of this invention includes a special shield located between each winding and the core and special shields between the windings themselves and shields between the primary winding circuit and the secondary winding circuit and also a shield that encloses the core, the windings and at least some of the foregoing shields.

The shield between each winding and the core also serves as a bobbin on which the winding is wound. In the simplest embodiment of the invention this shield is slit on one side thereof in a direction parallel to the axis of the coil. The combination bobbins and shields are insulated from the core of which the windings are wound and they are insulated from each other. In addition, special shield plates electrically connected to the bobbins are similarly slitted and they are located close to each other with their slits opposed. An auxiliary shield member is electrically connected to the bobbin and the shield plate associated with one of the windings in order to totally enclose that winding except for connections to a shielded cable through which the leads of that winding pass to elements of the circuit connected to that winding.

With this invention the stray capacitance between the two windings and between the elements of the two circuits associated therewith and between each winding and the elements of the circuit connected to the other winding are greatly reduced so that any slight unbalance in the windings or the circuits associated therewith is so small that alternating current signals existing in the primary winding circuit are very highly attenuated in the secondary winding circuit. More particularly, the attenuation attainable with the isolation transformer of this invention is so great that the amplitude of the alternating current signal appearing between the center taps of the two windings may be made as low as one hundred thousandth (0.000001) of the A.C. signal impressed across the primary winding.

In addition, the voltage transferred by the stray capacitance between the two windings is greatly reduced by utilizing an abnormal number of turns on the primary winding. As a result, the copper losses in the primary winding are much greater than the iron losses in the core instead of making them about equal as is normally done in order to attain high efficiency. By employing this relationship, the manufacture of small transformers having low stray capacitance is facilitated.

The foregoing and other features of the invention and various advantages thereof will be more readily understood from the following description taken in connection with the accompanying drawings in which.

In order to appreciate the need for this invention and to understand its operation, a brief consideration of a power supply employing an isolation transformer will be helpful. For these reasons, reference is first made to FIGS. 1 and 2, in which there is shown a network in which an isolation transformer IT that is employed for impressing alternating current from a source S on a rectifier RE. The isolation transformer comprises a primary winding PW and a secondary winding SW, both wound on an iron core IC. The primary winding comprises an upper half PW' and a lower half PW", while the secondary winding comprises upper half SW' and a lower half SW". The two windings PW and SW are center tapped.

The center tap PST of the primary winding is connected to ground GR such as by connection to the chassis or some other object with reference to which all A.C. potentials in the system are referred. The outer ends or terminals PT of the primary winding are connected by means of conductors CD to opposite sides of a source S of alternating current. The rectifier RE is a full wave rectifier. The outer ends or terminals ST of the secondary winding are connected through diodes D to the upper output terminal $OT_1$, while the center tap SST of the secondary winding is connected to the lower output terminal $OT_2$. A first filter capacitor $FC_1$ is connected between the two output terminals $OT_1$ and $OT_2$. Another filter capacitor $FC_2$ is connected between the lower output terminal $OT_2$ and ground GR.

Figure 1:
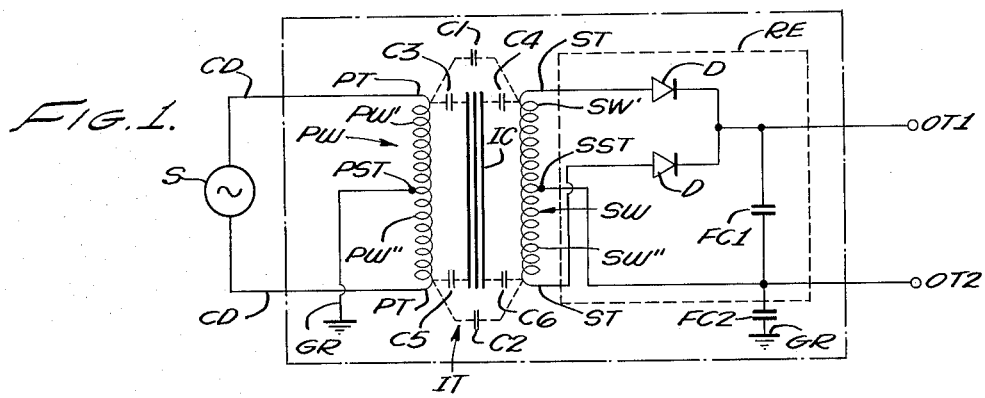
FIG. 1 is a wiring diagram of a power supply system employing an isolation transformer.

In such a power supply as that shown in FIG. 1, various stray capacitances $C_1$, $C_2$, $C_3$, $C_4$, $C_5$, and $C_6$ couple portions of the primary winding PW with portions of the secondary winding SW. The capacitor $C_1$ is a stray capacitance between the upper ends of the two windings while the capacitor $C_2$ is a stray capacitance between the lower ends of these windings. The capacitors $C_3$ and $C_5$ represent stray capacitance between the upper and lower portions of the primary winding PW respectively and the iron core IC. Similarly, capacitors $C_4$ and $C_6$ represent stray capacitances that exist between the upper and lower portions of the secondary winding SW and the iron core IC.

Figure 2:
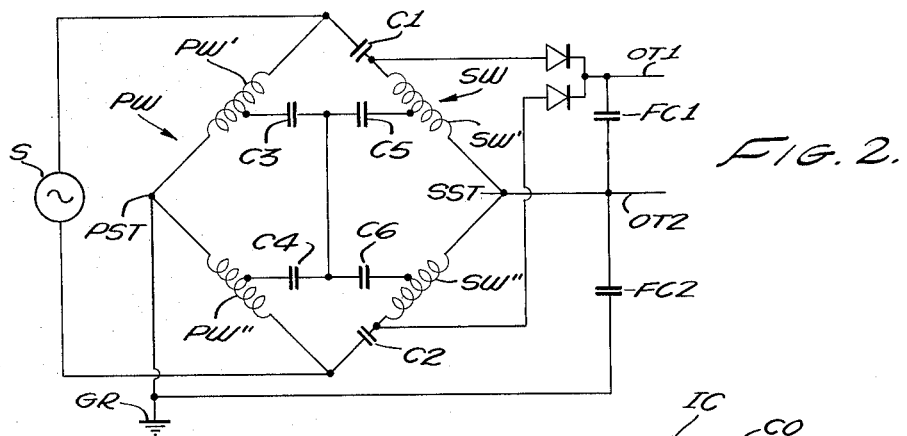
FIGS. 2 and 3 are schematic diagrams of a power supply transformer in accordance with this invention.
Figure 3:
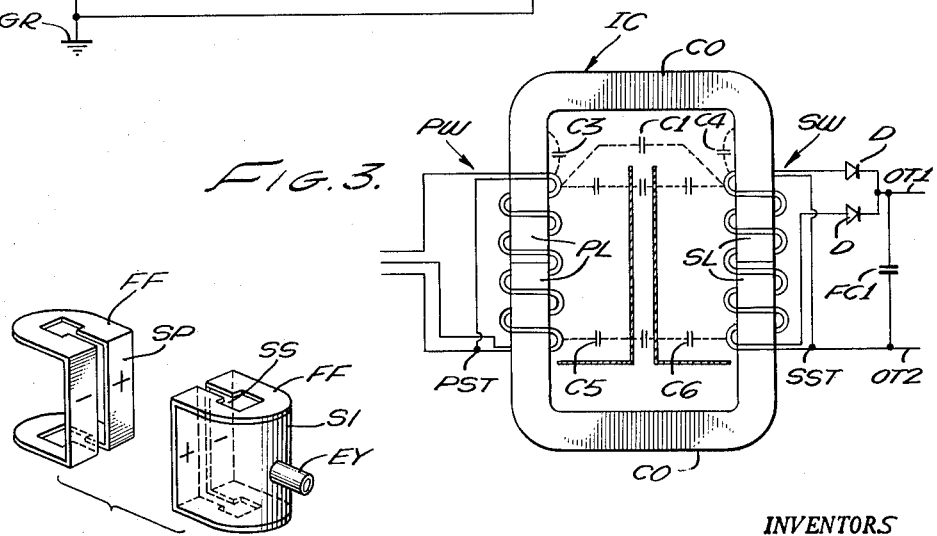

Actually, of course, each portion of each winding has a capacitive inductive effect relative to each portion of the other winding. Similarly, each portion of each winding bears an inductive capacitive relationship with each portion of the iron core. However, for simplicity various sources of stray capacitance have here been represented by the lumped-value capacitors $C_1$, $C_2$, $C_4$, $C_5$ and $C_6$. When considered in this way, the sections of the primary winding and the sections of the secondary winding and the various stray capacitors $C_1$, $C_2$, $C_3$, $C_4$, $C_5$ and $C_6$ may be considered as being connected together in a bridge as shown in FIG. 2. If for any reason there is any unbalance in the bridge, a signal appears across the filter capacitor $FC_2$ when an alternating current from a source is applied to the bridge. In effect, the alternating current is impressed by the source S across one pair of diagonals of the bridge, while the filter capacitor $FC_2$ is connected across the other diagonal of the bridge.

Heretofore, attempts have been made to compensate for such unbalanced conditions by the addition of trimming capacitors or other impedances in series with or in parallel with various parts of the windings. Usually such capacitors have been of substantial value, being at least of the order of a few pf. (that is, picafarads or micromicrofarads). Such trimming capacitors and the stray capacitors do not generally have the same temperature coefficient of capacitance. Accordingly, even though such compensation be introduced, the system could easily become unbalanced due to variations in the capacitance values introduced by changes in temperature.

According to this invention, instead of introducing compensating capacitors or other compensating elements, special shielding is provided for reducing the stray capacitance between the windings and more generally between the elements of the primary winding circuit and the elements of the secondary winding circuit.

Figure 4:
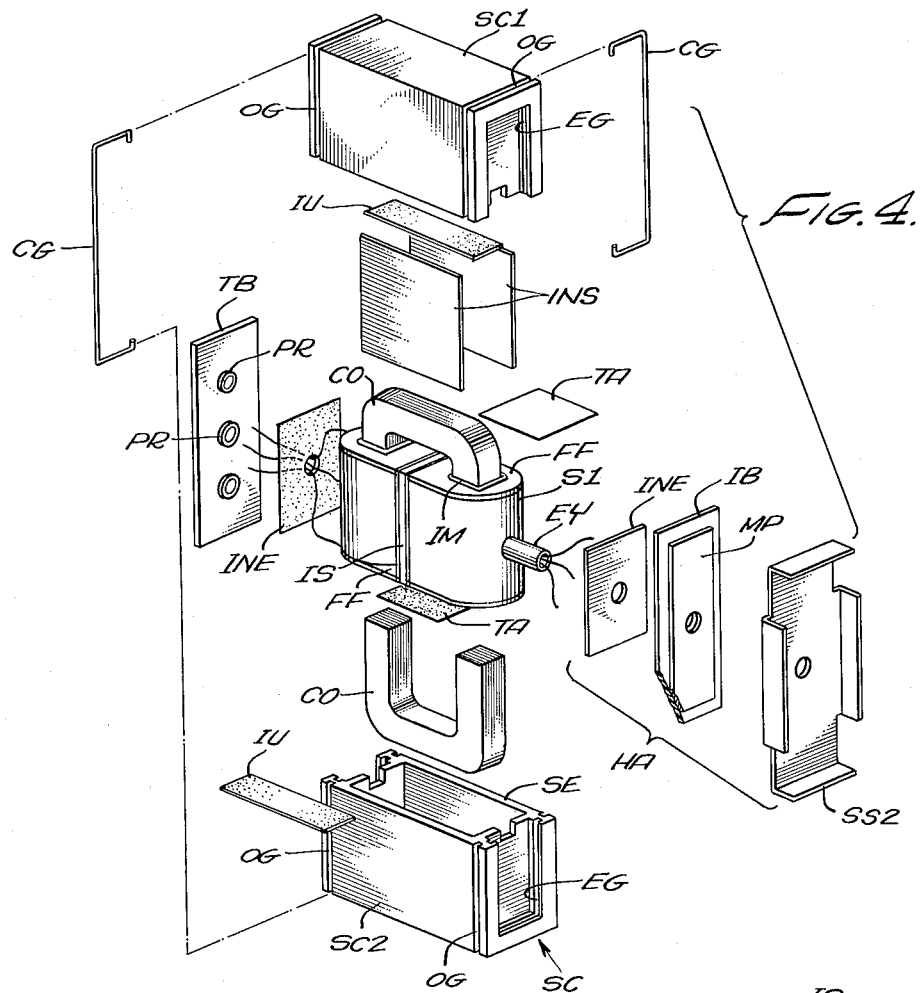
FIG. 4 is an exploded view of an isolation transformer of this invention.

In one embodiment of this invention, the primary winding PW and the secondary winding SW are wound on separate branches of a split-circle iron core IC that consists of two abutting core parts CO of U-shaped, or C-shaped, core sections forming legs PL and SL on which the windings are wound. The divisions formed by the tips of the core sections CO form thin "air gaps" at the centers of the respective windings. The legs are of square cross-section though they may be of rectangular or other cross-sectional shape. The cores CO are of conventional type, being made of a series of mutually insulated laminations as indicated in FIG. 4.

It is to be noted that the core of the isolation transformer of this invention is not grounded, but floats. This arrangement has the advantage of reducing eddy current losses that would otherwise arise if all the laminations were connected to a common ground or other common electrical terminal.

Figure 6:
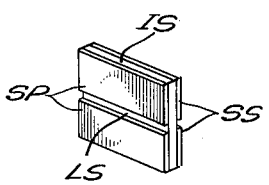
FIG. 6 is a perspective view of an isolation plate of this invention.

In order to achieve the required shielding, in accordance with this invention, shield plates SP and SS are mounted in the space between the primary winding and the secondary winding. The shield plates are formed on opposite sides of an insulator IS as shown in FIG. 6. The shield plates SP and SS are formed by means of metal deposited by plating or by printed-circuit techniques on opposite sides of an insulating spacer IS. Two parallel slits LS are formed in the shield plates SP and SS directly opposite each other.

Figure 11:
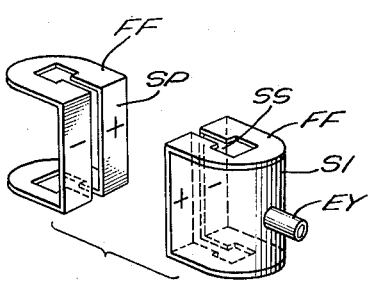
FIG. 11 is a diagrammatic view of a portion of the building of this invention.
Figure 5:
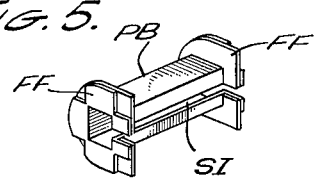
FIG. 5 is a perspective view of a bobbin in accordance with this invention.
Figure 7:
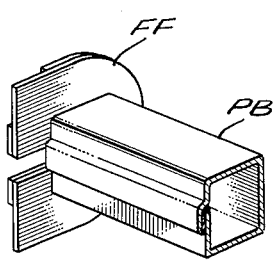
FIG. 7 is a perspective view of an alternate form of a bobbin in accordance with this invention.

In addition, the bobbins PB and SB upon which the windings PW and SW are wound, are composed of metal forms which shield each of the windings from the legs PL and SL of the core on which they are wound. As indicated more fully in FIG. 5, each of the bobbins PB and SB is formed out of sheet metal that is shaped to provide a square center section adapted to fit closely about a thin insulating member IM that separates each of the bobbins from the corresponding leg of the iron core, the leg being of square cross-section. Two flanges FF are arranged on the ends of the bobbins. These flanges are formed in part by means of tabs that have been formed by cutting and bending parts of the sheet of which the bobbin has been made and in part by rectangular pieces that are soldered to the tabs as shown in FIG. 5. Each of the bobbins is slitted on one side thereof throughout its entire length, one sidewall and the flanges being slitted on that side in a common plane perpendicular to that side wall as shown in FIG. 5. The slits S1 formed in the sidewall of the bobbins PB and SB breaks the electrical continuity in the bobbins in any path that encircles the corresponding leg PL or SL of the core. Each of the windings is wound on the corresponding bobbin between the flanges. The flanges themselves are soldered to the shield plates SP and SS respectively at the ends of the latter that are adjacent the ends of the bobbin as shown in FIG. 11. In an alternate arrangement illustrated in FIG. 7 the slit is formed by lapping the edges of the main part of the bobbin and separating the edges by a thin sheet of insulating paper.

A split casing SC that comprises two parts SC1 and SC2 as shown in more detail in FIG. 4 encloses the transformer so formed. The casing is composed of non-ferrous metal.

Figure 8:
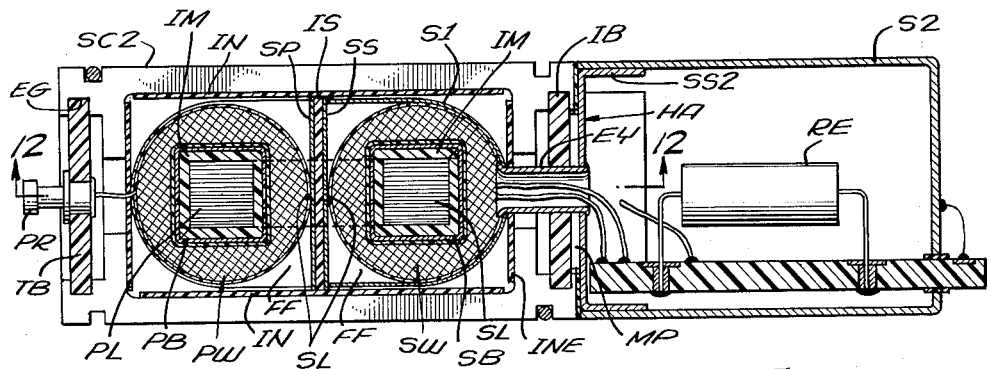
FIG. 8 is a cross sectional view of a power supply system of this invention.
Figure 9:
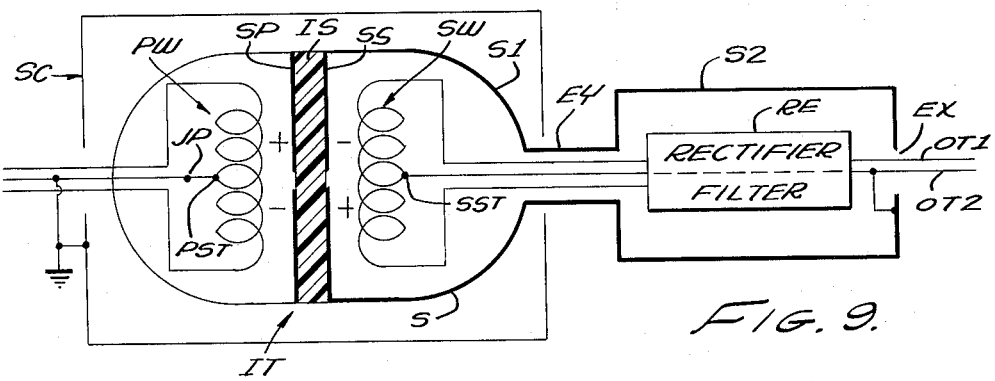
FIG. 9 is a schematic diagram of the power supply of FIG. 8.

Additional shielding is provided as indicated in FIGS. 8 and 9 to further shield the secondary circuit including the secondary winding SW and the rectifier unit RE from parts of the primary circuit. The additional shielding comprises three parts. One part is a semi-cylindrical or U-shaped metallic member $S_1$ that encloses the secondary winding SW and is soldered at its ends to the outer edges of the shield plate SS and to the edges of the flanges FF on the bobbin SB.

A metallic eyelet EY is soldered to the outer portion of the U-shaped shield member $S_1$ at a point thereof remote from the shield-plate SS. The axis of the eyelet extends through the center of the slit of the bobbin SB and the shield plate SS. This axis lies in a plane of symmetry of the bobbins. These planes are normal to sidewalls of the bobbins, and normal to the shield plates and also normal to the flanges of the bobbins. Thus, the U-shaped shield member $S_1$, the shield plate SS and the flanges of the bobbin SB totally enclose the secondary winding SW except for the slits in the bobbin SB and the shield plate SS and the passage that extends through the eyelet EY.

In addition, another shield member $S_2$ completely encloses the rectifier unit RE except for a part on one side which is soldered to the eyelet EY and a part on the other side which forms an insulated passage through which the output terminals $OT_1$ and $OT_2$ of the rectifier, extend.

The center tap PST of the primary winding PW is electrically connected to the corresponding bobbin PB by means of a solder connection JP to both the flanges as described below. The junctions JP are in the planes of symmetry of the primary winding bobbin.

An outer layer of insulating material IN completely encloses the transformer except for necessary conductor passages, thereby insulating the transformer from the shield case SC. Segments of insulating tape TA are located at the ends of the bobbins to assure that the bobbins will not be shorted to the transformer core CO. The outer insulation IN comprises two side pieces INS and two end pieces INE that encircle the transformer in order to assure that the flanges FF of the bobbins remain insulated and appropriately spaced from the end side walls of the shield case SC. In addition insulating sheets IU insulate the upper and lower ends of the core from the shield case SC and also press the tips of the two core sections CO together.

The two sections SC1 and SC2 of the shield case SC are of rectangular configuration, each being open on one side thereof. The two "open" sides abut each other to form a closed case that totally encloses the transformer. The seam SE formed between the two abutting portions lies in a plane which is normal to the axes of the two transformer windings PW and SW for a purpose which will be explained hereinafter. Slits or grooves EG are provided at opposite ends to facilitate the mounting of suitable connectors. More particularly a terminal board TB composed of insulating material is mounted in the grooves at one end. This terminal board is provided with three terminals PR to which the center tap and the two ends of the primary winding are electrically connected respectively. A header assembly HA is mounted in the grooves on the opposite side of the shield case SC. The header assembly includes an insulator board IB, a metallic plate MP cemented thereto, and a segment SS2 of the shield member S2 that encloses the rectifier RE. The insulating member INE on the side of the secondary winding and the various parts of the header assembly HA are provided with coaxial holes through which the eyelet EY extends in order to provide an electrical connection between the shield segment S1 and the shield segment SS2.

With the various parts of the transformer assembled, they are held in place by means of clamp springs CG that engage grooves OG in the outer walls of the shield case sections $SC_1$ and $SC_2$. In addition, or alternatively, the various parts may be held together by filling the transformer with thermosetting epoxy resin and by heat-treating the resin in place to cause the various parts of the transformer to adhere together solidly.

In one such transformer that has been manufactured, the bodies of the bobbins PB and SB were made of beryllium copper. The shield plates SP and SS were composed of copper. The sheet metal of which the bobbin was made was about 0.003" thick. It was previously determined experimentally that a thickness greater than about 0.0001" would be sufficient to provide the required shielding. The shield plates SP and SS were about 0.003" thick. The shield section $S_1$ was composed of brass. The sections $SC_1$ and $SC_2$ of the shield case SC were composed of beryllium copper, alloy AMS4890. This alloy has high conductivity that is 70% of that of pure copper. The insulating spacer IS, the internal insulators IM and the outer insulation layers IN were all made of Teflon-impregnated fiber glass sheets. Such material has a low dielectric constant of about 2.5. The header board IB was made of an epoxy impregnated fiber glass sheet. Such material has a somewhat higher dielectric constant of about 3.5. The internal spacers for the primary windings had a thickness of about 0.010". The lengths of the coils and hence also the lengths of the legs of the iron core on which they were mounted were about ½" long. The slits in the bobbin were about 0.032" wide, while the slits in the shield plates SP and SS were about 0.005" wide. Considered in its entirety, the transformer is very small and of light weight, but nevertheless is rugged.

Both the primary winding and the secondary winding are bifilar wound, thus partially balancing stray capacitance effects of the two halves of the windings. By virtue of the fact that the bobbin is composed of non-ferrous metal of high conductivity and the fact that the bobbin is slitted throughout its length on one side thereof, the various portions of the windings are electrostatically shielded from the legs of the core CO. Consequently the stray capacitance values $C_1$, $C_2$, $C_3$ . . . $C_6$ are very small. Furthermore, by virtue of the fact that the center taps PST and SST of the two windings are connected electrically to a point symmetrically located on the flanges of the bobbins on which the windings are wound, whatever small stray capacitances $C_3$, $C_4$, $C_5$ and $C_6$ exist between the windings and the core legs about which they are mounted, are very nearly equal.

The various portions of the primary winding PW are also well shielded from the secondary winding SW and the rectifier RE and the elements of any external circuitry that is connected to the rectifier output terminals $OT_1$ and $OT_2$. This high degree of electrostatic isolation of the primary winding from the various portions of the secondary winding circuit is accomplished in part by the fact the shield plate SP is electrically connected to the center tap PST of the primary winding and the shield plate SS is electrically connected to the center tap SST of the secondary winding and partially because of the fact that electrostatic lines of flux extending from any part of one winding to any part of the other winding must pass through the very narrow slits LS. The shielding of the primary winding circuit from the secondary winding circuit is also aided by the fact that the entire secondary winding circuit is enclosed within a single shield S.

Figure 10:
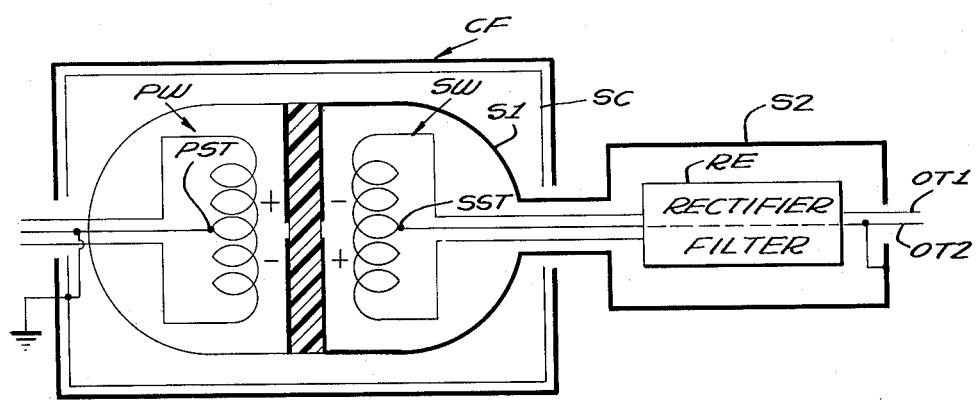
FIG. 10 is a schematic diagram of an alternative embodiment of the invention.

The shield case CS is very effective in reducing leakage inductance and hence is very effective in providing good regulation of the power supply provided by the isolation transformer and the rectifier. In effect the shield case SC forms a closed ring about the transformer so that any stray alternating magnetic fields that tend to extend outside the boundaries of the core, induce electrical currents in the shield case which, by Lenz' law, oppose such stray fields, hence very largely confining the magnetic flux to the core. It is to be noted that if the shield case were made of a ferrous, or soft magnetic material, the leakage inductance would be increased. However, it is desirable to employ a ferrous material in order to shield the transformer magnetically from external stray fields or to attenuate further the leakage field radiated by the transformer. For this reason an additional case member CF composed of ferrous material may be arranged outside of the non-ferrous shield case SC as schematically illustrated in FIG. 10.

In conventional transformer design, maximum efficiency in the transfer of energy from a primary circuit to a secondary circuit, is achieved by making the "iron losses" equal to the "copper losses." In other words, the dissipation of energy in the iron core is made equal to the dissipation of energy in the wire of the windings. Improvement in the shielding is achieved in accordance with this invention by departing from that rule.

In accordance with this invention the number of turns of wire occupying a given space around the core is made much larger than the number of turns required for maximum efficiency of energy transfer from the primary winding to the secondary winding. In the course of achieving the low stray capacitance and the low-voltage transfer, the winding loss has been made at least about five times as great as the core loss. Accordingly, with this invention the winding loss is made much greater than the core loss in order to increase the effectiveness of the shielding.

As a result, in this invention the shielding is improved by a reduction of the voltage differential between the opposing portions of the shield plates SP and SS. As indicated in FIGS. 9 and 11, the segments of the shield plates SP and SS that are opposite each other, are oppositely charged. The voltage transfer therefore between the shield plates is reduced by reducing the voltage difference that exists across the slits of the respective shield plates. By virtue of Lenz' law, the voltage across the slit of either shield plate SP or SS is equal to the voltage drop per turn of the associated winding Thus, the voltage drop across the slit of either of the shield plates SP or SS is decreased by increasing the number of turns on the corresponding winding PW or SW. The effective capacitance and hence the shielding is also reduced by employing a material of low dielectric constant as the shield plate support IS.

The fact that the leads from the two windings extend away from the transformer along lines perpendicular to the lines of magnetomotive force and the fact that these center taps are connected to the electrical centers of the shields about the respective windings, further reduces the unbalanced voltage coupling between the primary winding circuit and the secondary winding circuit. By the electrical center of a shield is means a point on the plane of symmetry.

With this invention, by virtue of the low values of various stray capacitances such as the stray capacitance $C_1$ and $C_2$ between the primary winding circuit and the secondary winding circuit, the stray capacitances $C_3$, $C_4$, $C_5$ and $C_6$, between the windings and the core, the isolation transformer may be readily used with a rectifier over a very high frequency range. For this reason, the isolation transformer of this invention is particularly beneficial to employ when the alternating current supplied to the primary winding, is in the form of a square wave This invention makes it more practical to employ such square wave alternating current energy because of the fact that differential phase shifts are not introduced by virtue of trim capacitors, as in the prior art.

Figure 14:
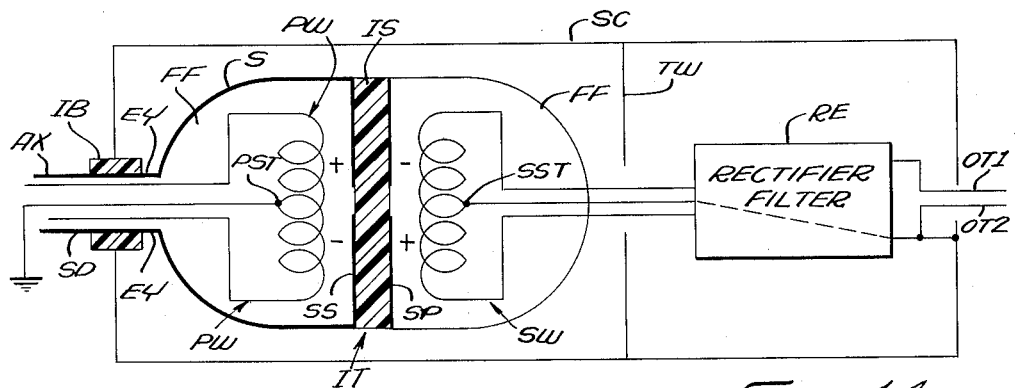
FIG. 14 is a schematic diagram of this alternative form of the invention illustrated in FIG. 13.
Figure 12:
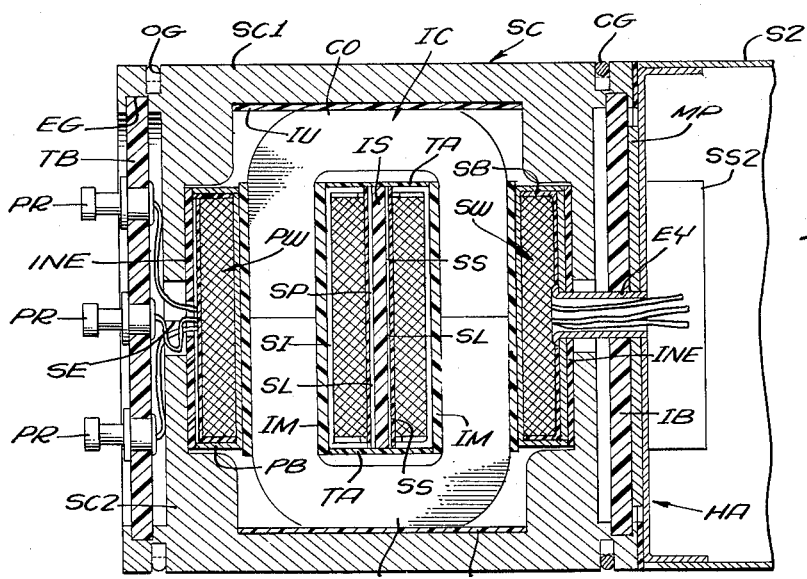
FIG. 12 is a cross sectional view of the transformer taken on the plane 12—12 of FIG. 8.
Figure 13:
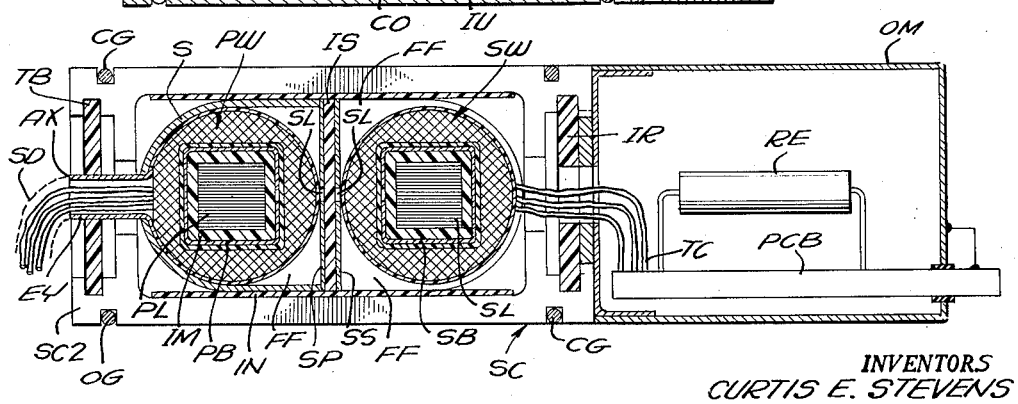
FIG. 13 is a cross-sectional view of an alternative form of the invention.

In an alternative embodiment of the invention represented schematically in FIG. 14 and in detail in FIG. 13, the shielding arrangement between the primary and secondary windings of FIG. 4 are interchanged. Thus in this embodiment of the invention the shield plate SS and the shell S enclose the primary winding PW instead of the secondary winding SW as in FIG. 4. Also the shield plate SP is associated with the secondary winding SW rather than with the primary winding PW as in FIG. 4. With this arrangement the center tap SST of the secondary winding is connected directly to the shield case SC and the only shield enclosing the secondary winding SW and the rectifier RE is the shield case SC. However, an apertured transverse wall TW extends across the shield case to minimize further any stray capacitance between the various parts of the rectifier RE and the various parts of the isolation transformer IT and to minimize leakage induction.

With this reversed arrangement the outer terminals and the center tap of the primary winding PW are connected to three leads of a shielded cable AX. The outer shield SD of the coaxial cable is electrically connected to the eyelet EY of the shield that encloses the primary winding PW and is electrically insulated from the shield case SC by means of an insulation bushing IB. The center tap PST of the primary winding or some other portion of the primary winding may be grounded as indicated in FIG. 14. It is to be noted that the rectifier is in the form of a group of components that are mounted on a printed circuit board PCB that has terminals TC that project through an insulating member IR in an outer metal case OM that encloses a shielded case SC of the same type as that previously illustrated in FIGS. 8 and 9. The arrangement of FIGS. 13 and 14 has the advantage over the arrangement of FIGS. 8 and 9 in that it is not necessary to employ a header assembly to insulate the rectifier from the shield case SC. With the arrangement of FIGS. 13 and 14 the outer case OM is also composed of nonferrous metal in order to minimize electrostatic induction between the parts of the rectifier and the external circuitry. To further isolate the secondary circuits, shielded cables may be employed to connect the terminals $OT_1$ and $OT_2$ of the rectifier to the parts of the circuit to which the rectifier supplies power.

It is thus apparent from the foregoing description that this invention provides an isolation transformer in which the capacitive coupling between the primary winding circuit and the secondary winding circuit is greatly reduced so that any slight unbalances in the system attenuates to a very high degree any alternating current signals that would otherwise be transmitted from the primary winding circuit to the floating leads of the secondary winding circuit.

Although only a few specific forms of invention having been disclosed herein it will be obvious to those skilled in the art that the invention is not limited thereto but is capable of being embodied in many other forms. Various changes which will therefore suggest themselves to those skilled in the art may be made in the composition of materials, the dimensions of parts, the details of construction, the arrangement of the elements and in the number of elements employed without departing from the principles of the invention. For example, the transformer cores may be of CI or DU configuration instead of CC configuration. Furthermore, the windings and shields may be of other shapes and may be made of other material. It is therefore to be understood that the invention is not limited to the specific embodiments thereof described herein but may be embodied in many other forms within the scope of the following claims.

The invention claimed is:

1. In an isolation transformer having a closed magnetic core comprising a pair of spaced-apart legs that extend along parallel axes:
    a pair of bobbins mounted on the respective core legs, each of said bobbins being composed of metal and having a narrow high-resistance zone along its length, the two zones of said two bobbins being on the inner sides of said legs;
    a pair of transformer windings on the respective bobbins about the respective core legs; and
    a pair of spaced-apart opposing shield plates supported between said windings, the two mutually insulated shield plates having narrow high-resistance zones midway along their lengths.

2. In an isolation transformer having a closed magnetic core comprising a pair of spaced-apart legs that extend along parallel axes:
    a pair of slit bobbins mounted on the respective core legs, each of said bobbins being composed of metal and having a slit along its length, the two slits lying on the inner sides of said legs;
    a pair of transformer windings on the respective bobbins about the respective legs; and
    a pair of spaced-apart opposing shield plates supported between said windings, the two mutually insulated shield plates being slitted, the slits of said shield plates and the slits of said bobbins being coplanar.

3. An isolation transformer as defined in claim 1 comprising:
    a shield case composed of non-ferrous metal enclosing said windings and said magnetic core; and an auxiliary shield member encircling one of said windings and forming with the bobbin and the shield plate associated with the latter winding an electrostatic shield that encloses said latter winding to shield said latter winding from the other winding and from said shield case.

4. An isolation transformer as defined in claim 3 comprising:
a shielded cable containing conductors that lead to terminals on said latter winding and having a tubular shield member encircling said conductors, said tubular shield member being electrically connected to the shield member that encloses said latter winding.

5. An isolation transformer as defined in claim 4, in which said conductors are led outwardly through said shield case along a line normal to the lines of magnetomotive force; and
means for leading conductors from the other winding out of said shield case along a line normal to the lines of magnetomotive force.

6. An isolation transformer as defined in claim 5, in which each of said windings has a tap that is electrically connected to the bobbin on which it is wound and in which each of said taps is connected to one of said conductors that is led from said each winding.

7. A power supply comprising an isolation transformer as defined in claim 5 and a full-wave rectifier circuit having rectifier components mounted within said shield case and electrically connected to said secondary winding.

8. In an isolation transformer:
a closed magnetic core comprising two C-shaped members having their tips abutting to form two spaced-apart legs extending along parallel axes;
a pair of bobbins mounted on the respective core legs, each of said bobbins being spaced from the respective legs by a layer of dielectric material, each of said bobbins being composed of metal and being electrically separated along a line along its length, the two lines of separation being on the inner sides of the respective legs;
a pair of transformer windings wound on the respective bobbins;
a metallic flange member on each outer end of each bobbin;
each of said flange members being electrically divided along lines of separation on the inner sides of the respective legs of said core; and
a pair of divided shield plates supported between said windings, each divided shield plate comprising two metallic segments that are electrically separated along lines of separation, each of said shield plates being mounted on opposite sides of a dielectric sheet member, all of said lines of separation lying in a common plate, the segments of each shield plate being electrically connected to the portions of the adjacent flanges that lie on opposite sides of said common plane.

9. An isolation transformer as defined in claim 8 comprising:
a shield case composed of non-ferrous metal enclosing said windings;
an auxiliary shield member encircling one of said windings and forming with the flanges on the bobbin and the shield plate associated with said one winding an external electrostatic shield that encloses said one winding to shield said one winding from the other winding and from said shield case;
a shielded cable containing conductors that lead to terminals on said last-mentioned winding and having a tubular shield member encircling said conductors, said tubular shield member being electrically connected to said auxiliary shield member; and
means insulating said electrostatic shield from said core and from said shield case.

10. An isolation transformer comprising:
a closed magnetic core having a pair of spaced-apart legs extending along parallel axes;
a pair of bobbins mounted on the respective core legs, each of said bobbins being composed of metal and having a narrow high-resistance zone along its length, the two zones being on the inner sides of said legs;
a pair of transformer windings wound on the respective bobbins about the respective core legs;
a pair of spaced-apart opposing shield plates supported between said windings, the two shield plates having narrow high-resistance zones along their lengths, the four high-resistance zones being coplanar; and
a shield case composed of non-ferrous metal enclosing said windings and said magnetic core, said shield case being mounted closely adjacent the outer sides of said windings.

11. In an isolation transformer having a closed magnetic core comprising a pair of spaced-apart legs that extend along parallel axes;
a pair of bobbins mounted on the respective core legs, each of said bobbins being composed of metal and being electrically separated along a line along its length, the two lines of separation being on the inner sides of the respective legs;
a pair of transformer windings wound on the respective bobbins, a metallic flange member on each outer end of each bobbin;
each of said flange members being electrically divided along lines of separation on the inner sides of the respective legs of said core; and
a pair of divided shield plates supported between said windings, each divided shield plate comprising two metallic segments that are electrically separated along lines of separation, each of said shield plates being mounted on opposite sides of a dielectric sheet member, all of said lines of separation lying in a common plane, the segments of each shield plate being electrically connected to the portions of the adjacent flanges that lie on opposite sides of said common plane.

12. An isolation transformer as defined in claim 11 comprising:
a shielded cable containing conductors that lead to terminals on said latter winding and having a tubular shield member encircling said conductors, said tubular shield member being electrically connected to the shield member that encloses said latter winding.

References Cited by the Examiner

UNITED STATES PATENTS

| 1,651,922 | 12/1927 | Hughes | 336—84 |
| 1,786,412 | 12/1930 | Crisson | 336—84 X |
| 2,088,526 | 7/1937 | Lissman | 321—8 X |
| 2,183,355 | 12/1939 | Mauerer | 336—84 |
| 2,533,920 | 12/1950 | Crook | 336—90 X |
| 2,633,561 | 3/1953 | Hewlett | 336—208 X |
| 2,904,762 | 8/1959 | Schulz | 336—84 |
| 2,911,604 | 11/1959 | Krause | 336—90 |
| 2,949,591 | 8/1960 | Craige | 336—208 X |

FOREIGN PATENTS

| 818,638 | 6/1937 | France. |
| 559,852 | 3/1948 | Great Britain. |

OTHER REFERENCES

Wireless World: Screening, June 1950, pp. 211–214.

LLOYD McCOLLUM, *Primary Examiner.*

SAMUEL BERNSTEIN, *Examiner.*